United States Patent [19]

Daniels et al.

[11] Patent Number: 4,627,657

[45] Date of Patent: Dec. 9, 1986

[54] TRUCK DEFLECTOR SHIELD

[75] Inventors: John A. Daniels, Arvada; John H. Ziegler, Longmont, both of Colo.

[73] Assignee: Autotron Products, Inc., Longmont, Colo.

[21] Appl. No.: 611,499

[22] Filed: May 17, 1984

[51] Int. Cl.[4] .............................................. B60J 1/20
[52] U.S. Cl. .................................. 296/91; 180/68.6; 296/95 Q
[58] Field of Search ................ 296/91, 15, 95 Q, 201; 52/208, 823; 180/68.6, 69.2; 105/2 R

[56] References Cited

U.S. PATENT DOCUMENTS

| | | | |
|---|---|---|---|
| 2,054,538 | 9/1936 | Graves et al. | 180/68.6 |
| 2,778,439 | 1/1957 | Pfingsten | 180/68.6 |
| 2,792,254 | 5/1957 | Hagglund | 296/91 |
| 3,008,756 | 11/1961 | Lindhardt | 296/91 |
| 3,015,517 | 1/1962 | Thornburgh | 296/91 |
| 3,596,974 | 8/1971 | Adams | 296/1 S |
| 3,815,700 | 6/1974 | Mittendorf | 180/68.6 |
| 3,831,696 | 8/1974 | Mittendorf et al. | 180/68.6 |
| 3,862,777 | 1/1975 | Schifano | 296/91 |
| 3,863,728 | 2/1975 | Mittendorf | 180/68.6 |
| 3,940,900 | 3/1976 | Russo | 52/238.1 X |
| 3,987,863 | 10/1976 | Mittendorf et al. | 180/68.6 |
| 4,142,758 | 3/1979 | Scaife | 296/91 |
| 4,153,129 | 5/1979 | Redmond | 180/68.6 |
| 4,159,845 | 7/1979 | Bratsberg | 296/95 R |
| 4,236,592 | 12/1980 | Ziegler | 180/68.6 |
| 4,471,991 | 9/1984 | Matthais | 296/91 |

Primary Examiner—Robert B. Reeves
Assistant Examiner—Carol L. Olson
Attorney, Agent, or Firm—John E. Reilly

[57] ABSTRACT

A deflector shield for trucks and other vehicles is releasably connected to upper and side edges of the truck's radiator grille. The deflector comprises a shield mounted on a base and the base has a pair of lateral flexible frames for attachment along the grille's upper edge, each frame extending away from the grille's center toward its side edges. An inclined channel is formed at the juncture of the concave front wall and inclined rear wall of the frame for receiving the elongated transparent shield therein and the entire base portion of the deflector shield can be secured to the radiator grille by means of screws or the like.

14 Claims, 5 Drawing Figures

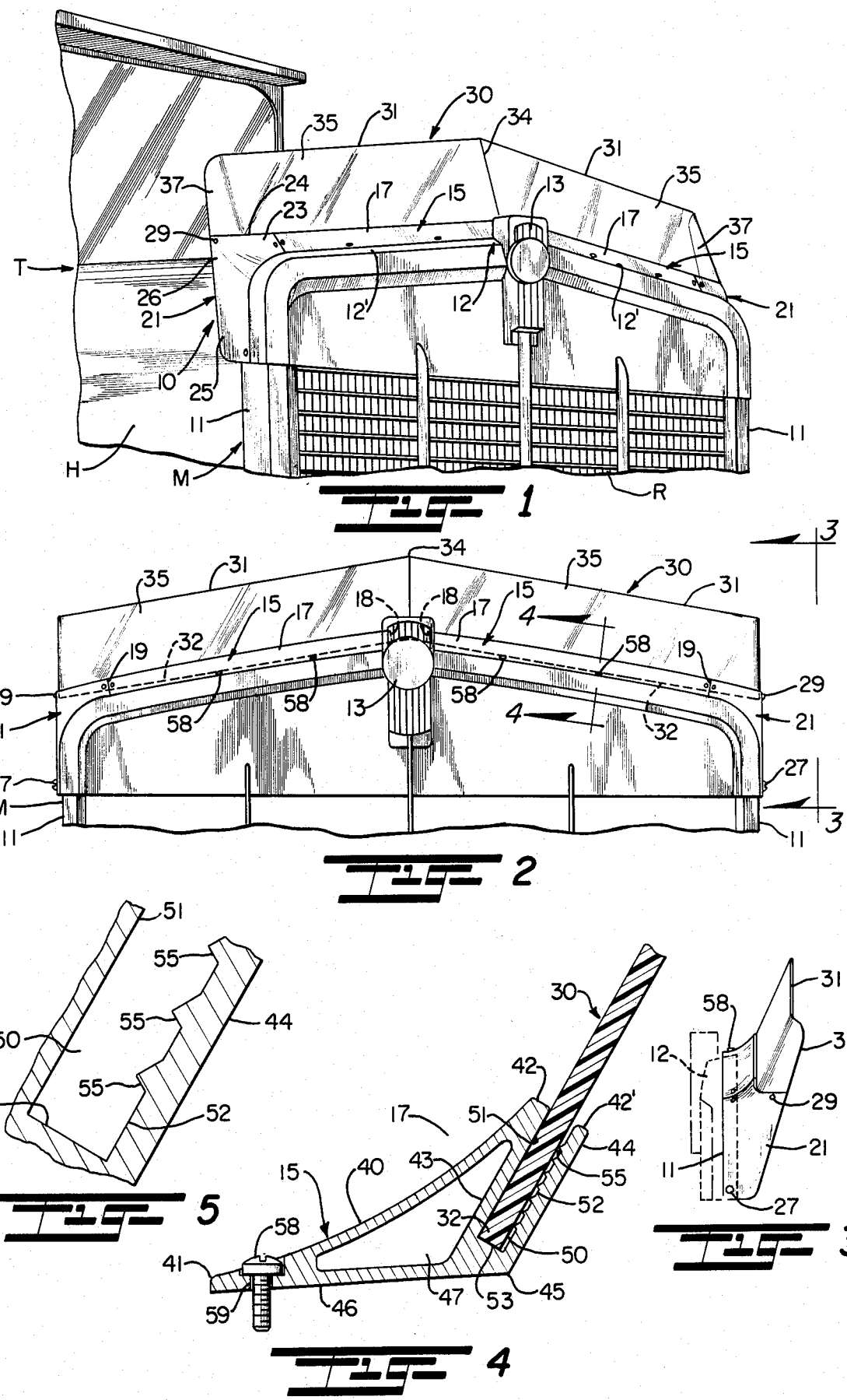

TRUCK DEFLECTOR SHIELD

This invention relates to automobile insect deflector apparatus, and more particularly relates to a novel and improved deflector assembly having extruded frame mounting means which is specifically adapted for use on trucks and the like.

BACKGROUND AND FIELD OF THE INVENTION

Many types of deflector shields have been devised for motor vehicles to protect the vehicle windshields and hoods from the impact and accumulation of insects, debris and other foreign materials. For the most part, prior art shields have been mounted to the vehicle by means of screws or bracket arrangements connecting the shield to the front of the radiator grille or to the front or underside of the vehicle hood.

Various prior art approaches are represented in U.S. Pat. Nos. 2,778,439 to A. F. Pfingsten; 3,831,696, 3,863,728, 3,987,863 and 4,178,034, all to T. H. Mittendorf. All generally disclose an insect deflector in combination with a screen framework which is mounted in front of the radiator grille by some type of bumper mounting means. The Pfingsten shield is angled slightly at the center to form opposite rearwardly extending shield sections, and is mounted so as to incline at a slight rearward angle with respect to the vertical. Mittendorf '034 and '863 illustrate the shields mounted in a channel-type bracket arrangement, while '696 teaches a rearwardly inclined V-shaped shield which is relatively wider at its outer side edge.

U.S. Pat. No. 3,008,756 to W. S. Lindhardt teaches a shield mounted in a slotted bracket and mounting block arrangement which includes slots whereby to permit adjustment of the angle of the shield. U.S. Pat. Nos. 3,862,777 to W. P. Schifano and 4,142,758 to R. H. Scaife illustrate deflector devices specifically adapted for use with trucks. Schifano employs a pair of deflector shields, which are S-shaped in cross-section, fastened in side-by-side relation to the front ends of a flat-front cab, directly beneath the windshield. Scaife is similar in operation but utilizes a generally planar deflector which is angled forwardly with respect to the front of a cab. A modified form of shield for conventional hooded trucks comprises a planar center portion having rearwardly offset side portions. Various devices employing channelled brackets for receiving and mounting the shields are represented by U.S. Pat. Nos. 4,153,129 to P. J. Redmond; 4,236,592 to J. H. Ziegler; and 3,015,517 to A. K. Thornburgh.

The present invention represents an improvement over the prior art in providing a shield of aerodynamically superior configuration which is mounted in an extruded "wrap-around" base that conforms to and is removably connected to the top and side edges of the radiator.

SUMMARY OF INVENTION

It is therefore an object of the present invention to provide for a novel and improved deflector shield apparatus which is specifically adapted for mounting on the hood of a truck to protect the hood and windshield of the vehicle against the impact and accumulation of insects, debris and other foreign matter, and which can be easily adapted for manufacture in a range of sizes to conform to different models of trucks.

It is another object of the present invention to provide for a novel and improved deflector shield apparatus which employs a somewhat flexible extruded base which wraps around and conforms to the top and sides of the vehicle hood in order to provide greater stability and security in mounting the shield with a minimum number of parts.

It is an additional object of the present invention to provide a deflector shield in combination with an extruded base which together present a particularly smooth and streamlined configuration offering minimum wind resistance while protecting the windshield of the vehicle from being obstructed or damaged by wind-carried foreign matter.

It is yet another object of the present invention to provide deflector shield apparatus which is relatively simple and economical to manufacture, has a minimum number of parts, and may be fastened to or removed from the hood of a truck with relatively little effort and requiring the use of only simple tools.

A still further object of the present invention is to provide a deflector shield assembly wherein both the shield and the base portion are somewhat flexible for ease in mounting and improved stress resistance.

Another object of the present invention is to provide a means for mounting the shield elements in the extruded base so that it is securely retained therein against shifting movement without the use of metal fasteners or rivets placed in or drilled through the shield.

In accordance with the present invention, there has been devised a deflector shield apparatus for trucks and the like which is adapted to be releasably connected to the upper and side edges of the radiator grille of a truck. The deflector apparatus comprises a shield mounted on a base portion, the base comprising a pair of lateral frame members of an extruded material of limited flexibility adapted to be affixed along the upper edge of a radiator grille, each extending away from the center of the grille toward the side edges thereof. Each frame member is defined by a rearwardly and upwardly sloped front wall, a planar inclined rear wall, and a planar bottom surface disposed in facing relation to the upper edge of the radiator grille. At the juncture of the concave front wall and inclined rear wall, a common horizontal upper edge portion has an inclined channel formed along the length thereof. Each frame member terminates at the side edge of the radiator grille in an end cap or fairing which extends downwardly and rearwardly so as to surround the side edge of the radiator grille. An elongated shield of transparent material is provided with a lower edge portion which is received and retained within the inclined channels along the upper edges of the frame members. Opposite ends of the shields are angled in a rearward direction at an angle of approximately 90° with respect to the main portion of the shield; the lower edges of these end portions are similarly retained along the upper edges of the end caps or fairings. The entire base portion of the deflector apparatus can be secured to the radiator grille by means of screws or other suitable fastening means.

The above and other objects, advantages and features of the present invention will become more readily appreciated and understood from a consideration of the following detailed description of a preferred embodiment of the present invention when taken together with the accompanying drawings of a preferred embodiment of the present invention, in which:

BRIEF DESCRIPTION OF THE DRAWINGS

FIG. 1 is a perspective view of the deflector shield assembly in accordance with the present invention, illustrated in attached relation to the radiator grille portion of a truck;

FIG. 2 is a front view in elevation of the deflector shield illustrated in FIG. 1;

FIG. 3 is a side view in elevation as viewed along lines 3—3 of FIG. 2, the radiator grille illustrated in dotted lines;

FIG. 4 is a cross-sectional view taken along lines 4—4 of FIG. 2; and

FIG. 5 is an enlarged detail view of the channel portion of the base with the shield removed to show the shield retaining means.

DETAILED DESCRIPTION OF THE PREFERRED EMBODIMENT

Referring in more detail to the drawings, there is shown in FIG. 1 the deflector shield apparatus 10 of the present invention mounted on a conventional truck T directly above the radiator grille R. Such grilles are typically provided with a shell or peripheral molding M comprising side and upper edge surfaces 11 and 12, respectively. Further, the molding M may include a central ornament 13 at the midpoint of the upper molding 12. The upper molding may extend parallel to the ground between the side moldings 11, but more frequently is "peaked" slightly in the center so that the upper molding is in fact in pair of upwardly converging right and left molding portions 12'.

The deflector shield apparatus 10 is removably connected to the radiator molding M, or in the absence of such molding may be connected in a similar location on the forward end of the hood itself, adjacent the radiator grille. The apparatus 10 comprises an inverted, generally U-shaped mounting base 15 which overlies and conforms to the side and upper edge surfaces 11, 12 of the molding in a collar-like fashion. The base is preferably composed of extruded metallic material which is slightly bendable, for example, aluminum. The base 15 comprises a pair of right and left lateral frame members 17 which are positioned along the upper surface 12 of the molding M such that ends 18 are in spaced relation to each other on either side of the center of the hood or hood ornament 13. Opposite ends 19 of the frame members 17 adjacent the juncture of the upper molding edge 12 and side edges 11 are provided with end caps or fairings 21 which curve downwardly and rearwardly away from the front of the truck, as will be described in greater detail below.

Shield 30 is mounted to base 15 and comprises an elongated unitary glazing member which is preferably composed of a transparent durable material, such as, acrylic plastic or Lexan ®. The shield member 30 is defined by upper and lower edges 31 and 32, and is angled at its midpoint 34 to form generally rectangular right and left rearwardly angled shield sections 35, the shield 30 thus assuming a wide V configuration when viewed from above. Alternately, the center bend could be eliminated and a straight shield employed, if required by the particular hood configuration to be outfitted. The diverging shield sections 35 terminate in wings 37, which are formed by bending a portion of the opposite ends of the shield sections rearwardly and toward the sides of the truck hood. The formation of the rearwardly curved wings 37 results in a more streamlined contour of the shield and improves aerodynamic characteristics thereof.

The construction of the base 15 and the manner in which the shield 30 is mounted therein is best illustrated in FIGS. 3 to 5. As will be seen from FIG. 4, the frame members 17 of base 15 are broadly triangular in cross-section and each comprise a somewhat concave front wall 40 extending between the lower and upper edges 41, 42, spaced, generally planar front and rear walls 43 and 44 which are inclined rearwardly with respect to the vertical at, an angle of approximately 30°, and extend between upper and lower edges 42', 45. A planar horizontal bottom surface 46 extends between the edges 41 and 45. As illustrated, the frame members are preferably formed with a hollow central portion 47 to provide a lighter, more flexible assembly, or may be solid if desired. A narrow, rearwardly inclined channel 50 is bounded by the front and rear walls 43 and 44; the channel extends the length of the frame member 17 and is adapted to receive the lower edge 32 of the shield 30 therein. The channel 50 is defined by front and rear surfaces 51, 52 and bottom edge 53, and extends to a depth sufficient to assure adequate support and stability for the shield mounted therein.

As shown in detail in FIG. 5, the rear surface 52 of the channel is provided with horizontal rows of vertically spaced teeth 55, several of such rows of teeth being provided at horizontally spaced intervals along the length of the channel 50 within the frame member 17. In order to secure and retain the shield 30 in the channel 50, a suitable bonding agent, such as, an epoxy resin is first deposited along the length of the channel, following which the shield 30 is inserted into pressfit relation within the channel. As illustrated in FIG. 4, the shield 30 is fully inserted through the bottom of the channel thereby to cause the bonding agent to flow between the mating surfaces of the shield and channel. By virtue of the formation of the channel 50 between the front and rear walls such that the spacing between the front wall and teeth 52 is slightly less than the thickness of the shield 30, the shield will cause the channels to expand slightly when inserted therein. Also, it will be apparent that the rear wall will have greater flexibility and be free to yield more or expand as the shield is inserted into the channel; and in this way will tend to spring back against the rear surface of the shield so as to cause the teeth 55 to dig into and grip the shield surface so as to cooperate in immovably retaining the shield in place within the channel. In this relation, the mounting base is preferably composed of a material possessing some limited resiliency, especially along the rear wall section which will be capable of expanding slightly as the shield is inserted into the channel but exerts some inward pressure against the shield once inserted into the channel.

As illustrated in FIGS. 1 and 3, fairings or end caps 21 are provided at opposite ends 19 of the frame member 17. Fairings 21 comprise lateral portions 23 which extend outwardly in coplanar alignment with the lateral frame member 17; the upper portion 26 of the fairing then curves in a rearward direction toward the cab of the truck at an angle corresponding to the angle of the wings 37 at opposite ends of the shield 30. The lower portion 25 of the fairing 21 curves downwardly to conform to the curvature of the radiator molding so that the fairing extends parallel to the side molding 11 and is secured thereto by means of a screw 27 or other suitable fastening means. The upper edge 24 of each fairing 21 extends to the outermost edges of each wing 37 and the lower edge 32 of the shield 30 and wing 37 is retained by a suitable fastener 29 to the inner surface of each end cap 21.

The base 15 is connected to the side and upper surfaces of the molding 11, 12 by means of screws 58 inserted through aligned apertures 59 drilled in the base 15 and the molding, the latter aperture not shown. As illustrated in FIG. 4, the screws are preferably countersunk to provide a streamlined surface, particularly on the concave forward surface 40 of the base 15.

It will be appreciated that the wrap-around or collar-like configuration of the inverted generally U-shaped base provides improved stability and security in mounting the shield on the truck. The shield and base have a certain degree of flexibility for greater ease in positioning and adjusting the deflector assembly to the truck upon which it is to be mounted. The deflector assembly can be made in a wide variety of sizes and configurations to conform with virtually any type of vehicle hood. The further advantage of the invention is that the base 15 supports the shield 30 at an optimal rearward inclination of approximately 33° from the vertical so as to provide the best possible deflection of air flow up and over the roof of the truck. The angle may vary depending upon the design of the vehicle, height of the cab and the like. Moreover, it will be appreciated that the wings 37 and wrap-around fairings or end caps 21 provide additional protection from wind carried debris by deflecting oncoming air currents both upwardly and laterally away from the sides of the truck.

It is therefore to be understood that various modifications and changes may be made in the specific construction and arrangement of parts comprising the present invention without departing from the spirit and scope thereof as defined by the appended claims.

We claim:

1. A shield assembly for mounting on a motor vehicle characterized by having a hood portion with a radiator grille suspended by a peripheral molding, said molding having a generally horizontal upper edge surface and opposite vertical side edge surfaces, said shield assembly comprising:
   an elongated shield of transparent material having a lower edge, opposite ends of said shield being angled rearwardly with respect to the plane of said shield;
   a mounting base portion comprising a pair of elongated horizontal frame members disposed in end-to-end relation traversing and conforming to the contour of said upper edge surface of said molding between said side edge surfaces, and end cap members disposed at opposite distal ends of said frame members and forming continuations thereof, said end cap members curving rearwardly and downwardly along said side edge surfaces of said molding, said frame members and said end caps each having a front wall and a rear wall defining a rearwardly inclined, upwardly opening channel therebetween, said lower edge of said shield and said opposite ends thereof inserted in said channel; and
   means for connecting said base portion and said end cap members in contact with said upper edge surface and said side edge surfaces, respectively, of said radiator molding.

2. A motor vehicle shield assembly according to claim 1, said channel including means for retaining said lower edge of said shield and said opposite ends therein.

3. A motor vehicle shield assembly according to claim 1, said mounting base being of generally triangular configuration having a bottom surface conforming to said generally horizontal upper edge surface and opposite vertical side edge surfaces of said molding.

4. A motor vehicle shield assembly according to claim 1, said shield disposed at an acute angle to said base.

5. A motor vehicle shield assembly according to claim 2, said shield disposed in press-fit relation to said channel.

6. A motor vehicle shield assembly according to claim 5, said retaining means including rows of horizontally extending teeth frictionally engaging said shield.

7. A motor vehicle shield assembly for mounting on a truck characterized by having a hood portion with a radiator grille surrounded by a peripheral molding, said molding having a generally horizontal upper edge surface and opposite vertical side edge surfaces, said shield assembly comprising:
   an elongated shield of transparent material having a lower edge, opposite ends of said shield being angled rearwardly with respect to the plane of said shield;
   a flexible mounting base portion comprising an elongated horizontal frame member traversing and conforming to the contour of said upper edge surface of said molding, and end cap members disposed at opposite distal ends of said frame member, and forming continuations thereof curving rearwardly and downwardly along said side edge surfaces of said molding and conforming to the configuration thereof, said frame member having a front wall and a rear wall defining a rearwardly inclined, upwardly opening channel therebetween to receive said lower edge of said shield and said opposite ends thereof; and
   fastening means for removably connecting said base portion to said upper and side edge surfaces of said radiator molding to conform to and overlie said molding.

8. A motor vehicle shield assembly according to claim 7, said mounting base comprising a pair of elongated, horizontal frame members disposed in horizontally spaced, end-to-end relation to one another, said frame members having a horizontal bottom surface conforming to the configuration of said upper edge surface of said molding.

9. A motor vehicle shield assembly according to claim 8, said frame members being generally triangular in cross-section, said front wall curving upwardly and rearwardly from a front edge of said mounting base, said end cap members curving downwardly and rearwardly away from the front of said truck.

10. A motor vehicle shield assembly according to claim 9, said shield including wings directed rearwardly from opposite ends thereof and retained by said end cap members in rearward extensions of said channel in said mounting base.

11. A motor vehicle shield assembly according to claim 7, said channel dimensioned to be of a width corresponding to the width of said shield, said rear wall of said mounting base being of limited resiliency and having teeth intruding inwardly toward mid front wall expandible when said shield is inserted therein to apply inward pressure against said shield, and a bonding agent between confronting surfaces of said shield and said channel.

12. In a motor vehicle shield assembly for mounting on a motor vehicle having a front radiator grille with a generally horizontal upper surface and an elongated planar shield of transparent material, a lower edge and opposite ends of said shield inclined rearwardly with respect to the intermediate portion of said shield, the combination therewith comprising:

a flexible mounting base portion including an elongated frame member having a bottom surface conformable with said upper edge surface of said grille and of a length to traverse the length of said upper edge surface of said grille, said frame member being generally triangular in cross-section including a front wall and a rear wall defining a rearwardly inclined, upwardly opening channel along the substantial length of said base portion;

said shield having a lower edge insertable in said channel and means for retaining said lower edge in said channel with said shield inclining upwardly and rearwardly from said base portion; and means for connecting said base portion and said end cap members in contact with said upper edge surface and said side edge surfaces, respectively, of said radiator molding.

13. A motor vehicle shield assembly according to claim 12, said mounting base comprising a pair of horizontal frame members disposed in end-to-end relation to one another, said frame members having a cross-sectional configuration conforming to the configuration of said upper edge surface of said molding.

14. A motor vehicle shield assembly according to claim 12, including a concave front wall, opposite ends of said frame having end caps with said base portion of said end cap extending downwardly at 90° to said horizontal frame, and a lateral rearward extension with said channel therein forming a continuation of said channel in said frame.

* * * * *